United States Patent [19]
McLaughlin

[11] Patent Number: 6,153,157
[45] Date of Patent: Nov. 28, 2000

[54] VALUE IMPROVEMENTS OF CLAYS

[75] Inventor: Robert Joseph McLaughlin, Alphington, Australia

[73] Assignee: McLaughlin Geosurveys Pty. Limited, Alphington, Australia

[21] Appl. No.: 09/214,584

[22] PCT Filed: Sep. 25, 1997

[86] PCT No.: PCT/AU97/00636

§ 371 Date: Dec. 31, 1998

§ 102(e) Date: Dec. 31, 1998

[87] PCT Pub. No.: WO98/14401

PCT Pub. Date: Apr. 9, 1998

[30] Foreign Application Priority Data

Sep. 30, 1996 [AU] Australia .................... PO 2640

[51] Int. Cl.[7] .................. C01F 7/02; C01B 33/26; C01B 33/12

[52] U.S. Cl. .................. 423/114; 423/127; 423/132; 423/625; 423/629; 423/335; 423/328.1; 423/328.2

[58] Field of Search .................... 423/122, 132, 423/335, 626, 629, 328.1, 328.2, 114, 127, 625

[56] References Cited

U.S. PATENT DOCUMENTS

| | | |
|---|---|---|
| 4,069,296 | 1/1978 | Huang ............................ 423/127 |
| 4,342,729 | 8/1982 | Garcia Clavel et al. ........... 423/127 |
| 4,388,280 | 6/1983 | Gruzensky et al. ............... 423/131 |
| 4,526,763 | 7/1985 | Bartlett et al. . |
| 4,554,138 | 11/1985 | Marcantonio . |

FOREIGN PATENT DOCUMENTS

| | | |
|---|---|---|
| 213005 | 1/1975 | U.S.S.R. . |
| 1222823 | 2/1971 | United Kingdom . |

*Primary Examiner*—Tom Dunn
*Assistant Examiner*—Christina Ildebrando
*Attorney, Agent, or Firm*—Edwin D. Schindler

[57] ABSTRACT

A process which allows the conversion of clay minerals of the kalonite group, to a relatively pure form of alumina and silica respectively comprising the steps of (a) heating the kaolinite group minerals to greater than 500° C., which causes dehydroxylation of the crystallographic lattice and formation of an intermediate meta-kaolin; (b) reacting the intermediate with only one of a selection of reagents including acids, alkalines or metalliferous compounds followed by heating of the mixture to form an aluminium salt in solution and residue of silica; (c) separation of the aluminium salt solution from the residue of silica by filtration and further treatment of the silica residue to produce a relatively pure form of fine particled silica; (d) formation of an alum by addition of ammonium sulphate in solution to the aluminium salt solution and further treatment of the alum to produce a relatively pure form of aluminium hydroxide.

19 Claims, 3 Drawing Sheets

VALUE IMPROVEMENTS OF CLAYS

BACKGROUND OF THE INVENTION

1. Technical Field of the Invention

This invention relates to a process for the improvement in the value of clay—especially kaolinite group minerals.

2. Description of the Prior Art

An increasing demand for high purity materials is part of ongoing technological change. The two most common elements at the surface of the earth, aluminium and silicon, are now in demand as high purity oxides, however these are surprisingly difficult to obtain. This means less than 100 parts per million of impurity, and in some applications of the oxides of aluminium and silicon this figure is substantively less.

There is a simple reason for this, and this is essentially that minerals, by their nature, are not pure compounds. For example, the common oxide of silicon-quartz normally contains a variety of other elements, either subsisting in the silicate lattice or in the channels in the lattice produced by spirals of silicate tetrahedra $(SiO_4)^{4-}$ that are arranged along the vertical crystallographic axis (C). Grinding quartz, in an attempt to liberate or release these impurities has very obvious limitations. It becomes increasingly difficult and costly to grind below a fine particle size. About five micrometres is the limit and even at this size, the energy consumption is considerable.

At a size range of five micrometres, the particle is far beyond the measurement of a molecular cell of quartz, which is slightly less than five angstroms. The comparison between the two measurements is that an angstrom is one ten-thousandth of a micrometre, hence the difficulty of using size reduction to release any entrained elements in the quartz structure.

The solution to this problem of obtaining very pure oxides has been conventional processing e.g. the volatilisation of silicon via halides and then a subsequent hydrolysis. Even here, problems exist, because of volatility of other element halides.

In the case of aluminium a difficulty exists, because of the usual methods of processing bauxite ore that involve a caustic digestion under pressure. The caustic soda (NaOH) used in this digestion is invariably entrained in the hydrated alumina produced. The problem is such that high purity alumina is difficult to obtain free of sodium. This latter element, even at parts per million level can profoundly change the behaviour of alumina at elevated temperatures. This limits use as a refractory material.

A further problem associated with processing of bauxite ore, is that the sodium which is ultimately removed from the alumina is actually in the form of a red mud-like material, which does not harden. It is stored as a pool within a basin which is lined with a black thick plastic. Over time the plastic may develop a small enough aperture to allow the sodium to leach into the soil, thereby creating huge environmental problems.

It has been found that materials that have been leached by the weathering process comprise a high proportion of aluminium and silicon and other elements are in minute amounts.

Kaolinite in the different crystallographic modifications such as kaolinite pM. and kaolinite T. is a common mineral constituent of weathered rocks and it is these minerals that are preferably made use of to ultimately produce relatively pure oxides of alumina and silica, however alumina silicates such as allophane can not be excluded from also being produced.

SUMMARY OF THE INVENTION

The object of this invention is to utilize materials that have been leached by the weathering processes, more particularly clay minerals of the kaolinite group such as nacrite, dickite, kaolinite, and halloysite in their different crystallographic modifications, so that, apart from aluminium and silicon, the other elements are in minute amounts and further to this, to separate the dominant constituents from each other and from other elemental impurities.

The invention in its broadest sense is a process which allows the conversion of clay minerals of the kaolinite group, to a relatively pure form of alumina and silica respectively comprising the steps of:

(a) heating the kaolinite group minerals to greater than 500° C., which causes dehydroxylation of the crystallographic lattice and formation of an intermediate meta-kaolin.

(b) reacting the intermediate with only one of a selection of reagents including acids, alkalines or metalliferous compounds followed by heating of the mixture to form an aluminium salt in solution and residue of silica.

(c) separation of the aluminium salt solution from the residue of silica by filtration and further treatment of the silica residue to produce a relatively pure form of fine particled silica.

(d) formation of an alum by addition of ammonium sulphate in solution to the aluminium salt solution and further treatment of the alum to produce a relatively pure form of aluminium hydroxide.

In a preferred embodiment of the invention, the kaolinite group mineral which is preferred as a starting product for the conversion to a pure form of alumina and silica is a kaolinite of a particular crystallographic form such as kaolinite pM or kaolinite T which is heated above 500° C. causing the dehydroxylation of the crystallographic lattice, with the loss of water and a residue in which the aluminium originally bonded to oxygen ($O^{2-}$) and hydroxyl ($OH^-$), becomes an unstable material since the aluminium has a variety of co-ordinations (nearest bonding neighbours) of (4, 5 & 6).

This gives a distorted sheet of aluminium bonded to oxygen ($O^{2-}$). As a result of this distortion, it appears that energy is stored in this crystallographic lattice, since the intermediate which results and is termed a dehydroxylated compound is in fact meta-kaolinite. The meta-kaolinite is extremely reactive and does appear to have some properties of rehydroxylation. The meta-kaolinite reacts exothermically with various reagents, both acid, alkaline and metalliferous, however it is preferable to react the meta-kaolinite with an acid such as sulphuric acid, since corrosion problems within the reaction vessel are reduced and further to this, due to the solubility of the reacted products these can be used at a further stage in the separation of extraneous elements.

As has been previously mentioned, the extremely reactive meta-kaolinite can react with metalliferous compounds, and it is in fact known that barium carbonate ($BaCO_3$) reacts readily with a meta-kaolinite to produce celsian, a barium aluminium silicate.

The reaction of meta-kaolinite with acids has been found to be exothermic, therefore such mixtures, given time, will react at ambient temperature, but the full reaction period is measured in months.

In the preferred embodiment the reaction mixture is heated, with stirring to equalize temperature differentials, the chemical equilibria change, quite rapidly, to give an aluminium salt, in solution, and a residue of silica. The solution and residue may then be separated by conventional filtration methods.

Based on what has been described so far, there are problems that arise particularly as a result of the contaminate oxides present in the original kaolinite e.g. iron. It has been found that the heated solution from a meta-kaolinite/acid reaction, can be poured over, or mixed with more meta-kaolinite to remove a great part of the iron values and also to reduce the acidity of the reaction solution. This implies an increase in amount of aluminium in solution and a reduced iron content. There are, of course, other methods of reducing contaminating elements, such as solvent extraction, but these can be capital intensive.

The simpler and preferred method is to rely on the differing solubilities of aluminium salts in water at ambient and raised temperatures. The compound chosen to aid in the eradication of the contaminate oxides is an alum called ammonium alum $(NH_4Al(SO_4)_2 \cdot 12H_2O)$ since this compound may be purified by re-crystallization procedures.

To the filtered solution from meta-kaolinite and sulphuric acid a solution of ammonium sulphate is added and is then heated. Provided that the reheated solution is not very acidic and the aluminium content is high, a crystallization of ammonium alum takes place on cooling. This material may be further purified, but is also able to be utilised as a water purifier as well as for other commercial purposes.

BRIEF DESCRIPTION OF THE DRAWING FIGURES

FIGS. 1–3 graphically illustrate reflection/absorption (%), i.e., differences in reflectivity, at wavelengths of between 300 nm–650 nm, between a kaolinite and the silica obtained, as a measure of the purity of the silica, in accordance with the method of the present invention.

DETAILED DESCRIPTION OF THE PREFERRED EMBODIMENTS

There are then several routes one may select to follow to produce the high purity aluminium hydroxide $(Al(OH)_3)$ from ammonium alum. There is one route that involves heating the alum to drive off both water and sulphate. This route does suffer from sulphate absorption on the alumina component, but for some purposes this may not cause problems. The second and preferred route is to precipitate the aluminium as hydroxide from alum solution in water, using ammonium hydroxide. The aluminium hydroxide is filtered and absorbed sulphate may be removed by either using neutral ammonium acetate solution or conventional electrodialysis. The excess ammonium acetate is removed by washing with an alcohol such as ethanol. The ammonium sulphate solution from filtration may be re-used to produce more ammonium alum as was previously mentioned. The hydrated aluminium hydroxide may be heated to derive various forms of aluminium oxide.

The silica residue from the reaction between the acid and meta-kaolinite is heated with a mixture of sulphuric acid and ammonium sulphate. Concentrations of this acid mix are not so important as the temperature to which the mixture may be raised. A concentration of 40% sulphuric to 10% ammonium sulphate has been found to be effective. The lower the concentration, the longer the digest time. This process is important since the fine silica absorbs many compounds, for example iron and titanium. After filtration, washing with neutral ammonium acetate solution removes absorbed iron compounds. The excess ammonium acetate is removed by washing with alcohol such as ethanol. A final separation using elutriation is recommended, to remove large particles and other foreign material such as mica present in small platelets.

Figure 1:
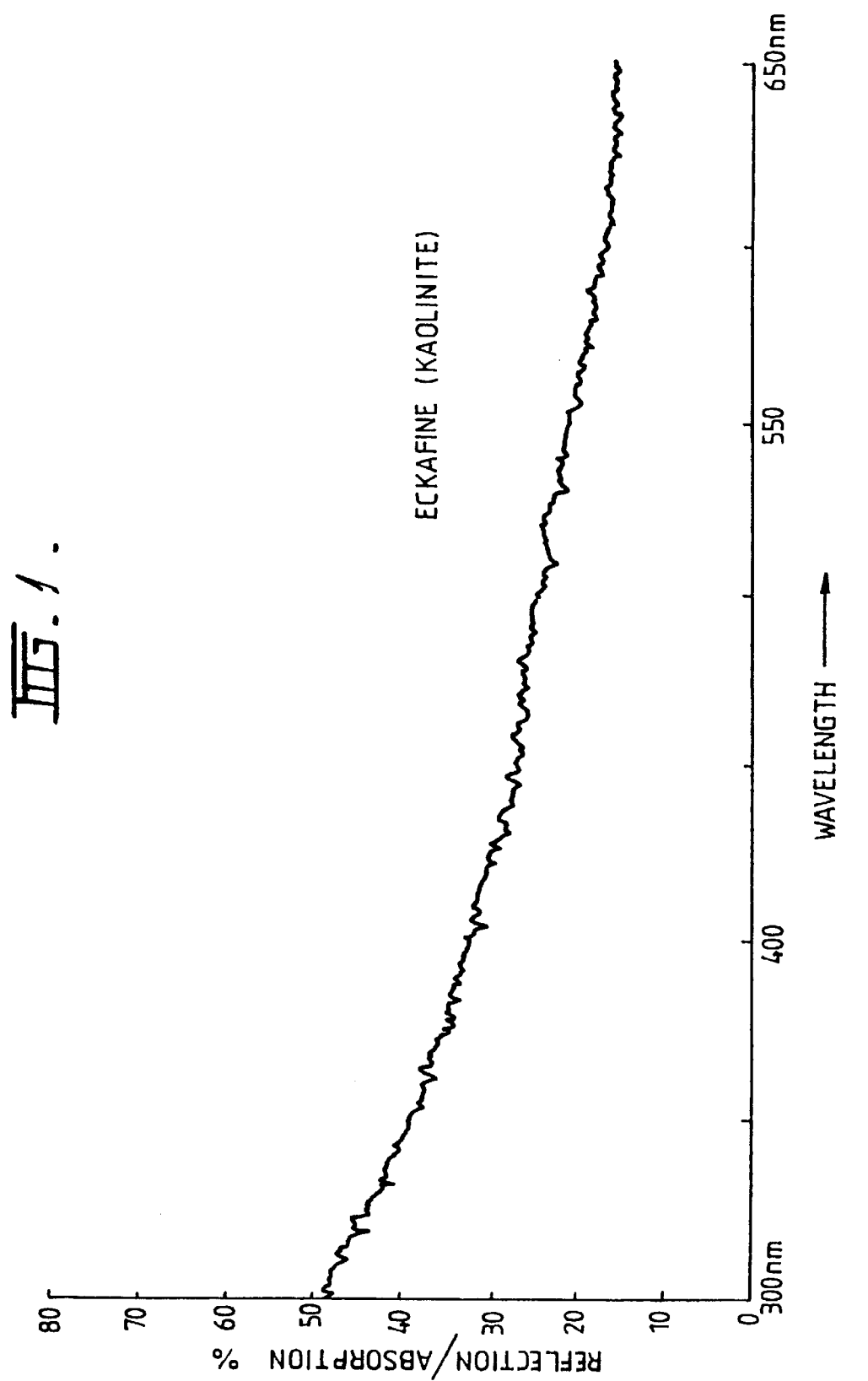
Figure 2:
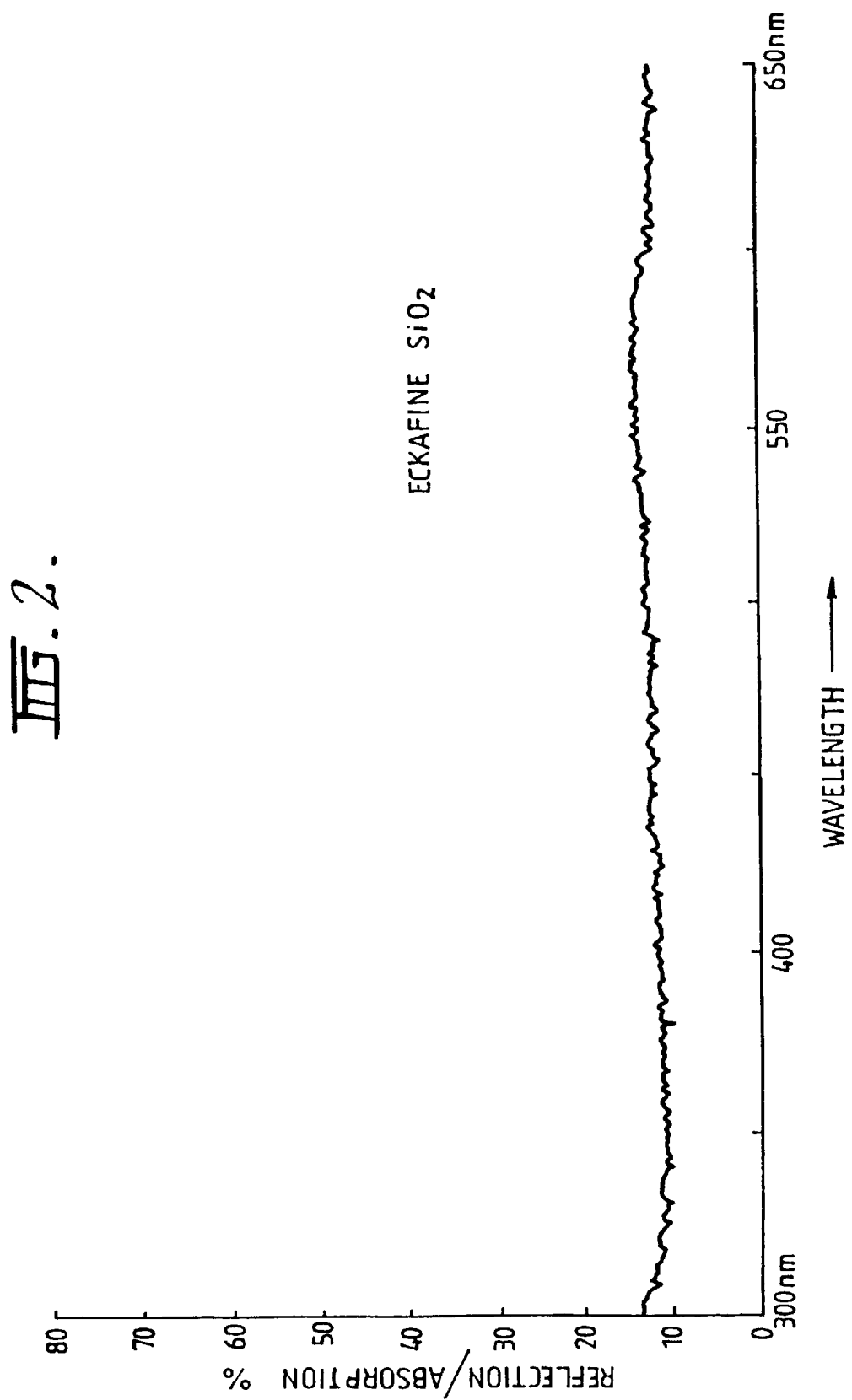
Figure 3:
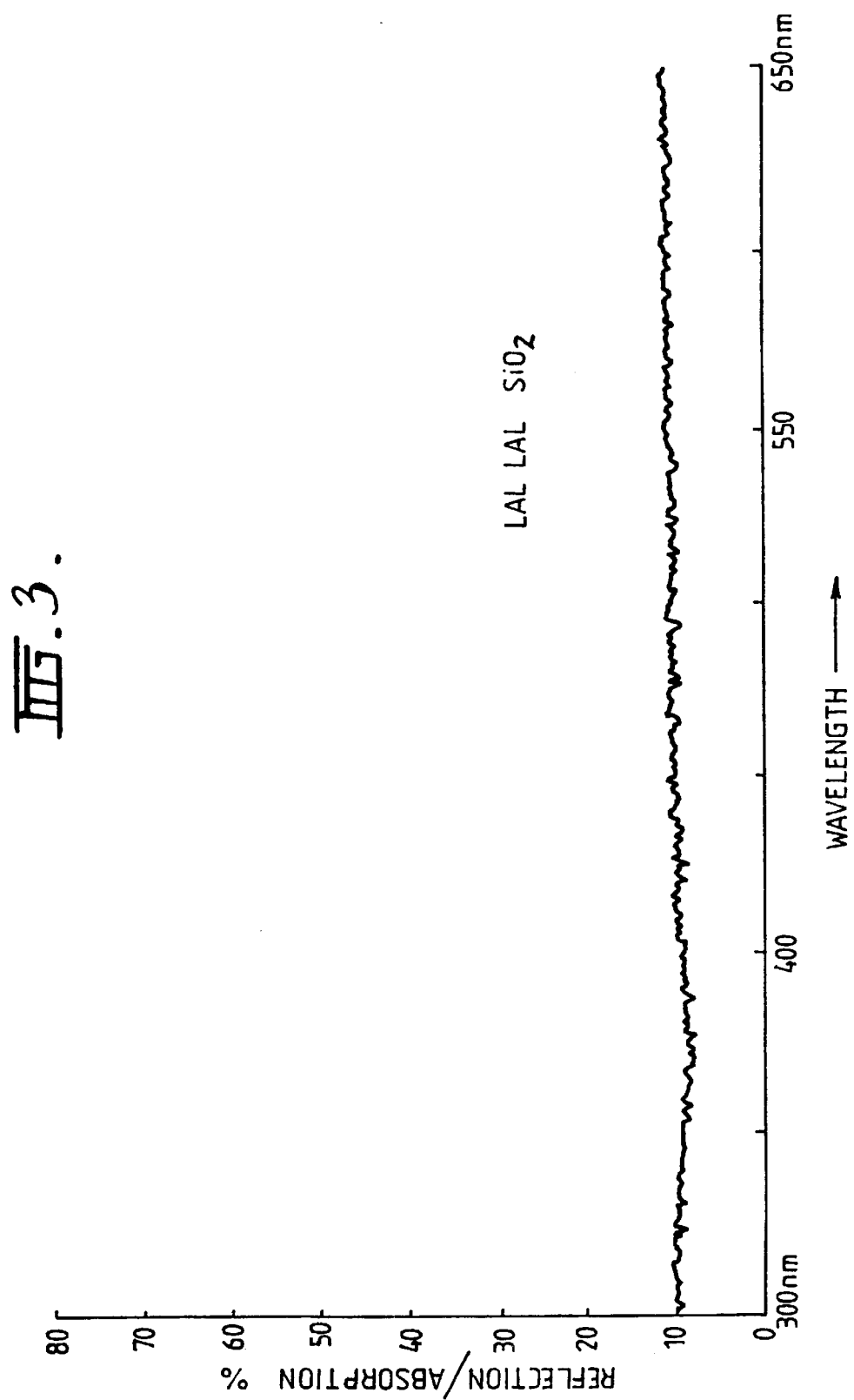

The silica obtained as a result of the purification process is remarkably white when dried. Analysis of the silica show that there is not a drop in reflectivity at short wavelengths of light, so that the reflectivity of the silica is excellent. Graphs of Reflection/Absorption % v Wavelength(nm) of two samples of silica obtained as a result of the process previously described as against a graph of Reflection/Absorption % v Wavelength(nm)(FIGS. 1 & 2) illustrate the differences in reflectivity between a kaolinite and the silica ultimately obtained there from (FIG. 3)

In all of the operations described the containment vessels must be chosen with care so that corrosion may be minimized. Certain types of plastic have been found suitable. To limit the addition of impurities to the separated oxides, plastic is also preferred, but other materials may be used if so required.

The essence of this invention is the preparation of high purity oxides of alumina and silica and it is to be understood that further variations of this concept than here described can be made.

EXPERIMENTAL RESULTS

Production of Aluminium Hydroxide and Other Oxides 2 kg of Kaolinite T is heated above 500° C. causing the dehydroxylation of the crystallographic lattice, and the formation of a meta-kaolinite.

10% sulphuric acid is added to the meta-kaolinite and the reaction mixture is heated resulting in the formation of an aluminium salt in solution and residue of silica. The solution and residue are then separated by conventional methods.

To the filtered solution from meta-kaolinite and sulphuric acid, a solution of ammonium sulphate is added and is then heated, resulting in the crystallisation of ammonium alum on cooling.

Aluminium hydroxide is precipitated from alum solution in water using ammonium hydroxide. Absorbed sulphate in the aluminium hydroxide may be removed by either using neutral ammonium acetate or conventional electrodialysis.

The ammonium sulphate solution from filtration may be re-used to produce more ammonium alum as has been previously described.

The hydrated aluminium hydroxide may be heated to derive various forms of aluminium oxide.

Production of Silica

The silica residue from the reaction between the acid and meta-kaolinite is heated with a mixture of 40% sulphuric acid to 10% ammonium sulphate. After filtration, the precipitate of silica is washed with neutral ammonium acetate solution. The excess ammonium acetate is removed by washing with an alcohol such as ethanol. A final separation using elutriation is recommended, resulting in relatively pure silica.

The following table illustrates three different clay samples obtained from various parts of Victoria, Australia, and shows the content of $Al_2O_3$ and $SiO_2$ in particular in a raw clay and then the content of $Al_2O_3$ and $SiO_2$ obtained after treatment of the raw clay as described in the body of this specification.

The Table on the following page indicates the percentage of oxide present, and the elements present are given in parts per million.

| Element/Oxide | Sample 1 RAW CLAY | Al(OH)₃ | SiO₂ | Sample 2 RAW CLAY | Al(OH)₃ | SiO₂ | Sample 3 RAW CLAY | Al(OH)₃ | SiO₂ |
|---|---|---|---|---|---|---|---|---|---|
| $SiO_2$ | 46.5 | 0.08 | 90.93 | 46.73 | 0.01 | 94.29 | 51.88 | 0.31 | 92.92 |
| $TiO_2$ | 0.72 | 0.00 | 0.02 | 0.60 | 0 | 0.02 | 0.64 | 0.00 | 0.02 |
| $Al_2O_3$ | 36.72 | 67.23 | 0.16 | 35.36 | 75.91 | 0.41 | 42.22 | 68.04 | 0.28 |
| $Fe_2O_3$ | 0.53 | 0.15 | 0.13 | 0.05 | 0.04 | 0.09 | 0.45 | 0.19 | 0.05 |
| MnO | 0.00 | 0.00 | 0 | 0 | 0 | 0 | 0 | 0 | 0 |
| MgO | 0.07 | 0.04 | 0 | 0.09 | 0.08 | 0.01 | 0.24 | 0.07 | 0 |
| CaO | 0.01 | 0.03 | 0 | 0.02 | 0.04 | 0.01 | 0.12 | 0.06 | 0.01 |
| $Na_2O$ | 0.02 | 0.20 | 0.06 | 0.02 | 0.01 | 0.05 | 0.20 | 0.09 | 0.07 |
| $K_2O$ | 0.13 | 0.05 | 0.01 | 0.14 | 0.02 | 0.03 | 0.05 | 0.03 | 0.01 |
| $P_2O_5$ | 0.06 | 0.21 | 2.14 | 0.33 | 0.01 | 1.75 | 0.33 | 0.11 | 0.11 |
| $SO_3$ | 97.6 | 19.71 | 4.24 | 0.47 | 19.52 | 0.83 | 0.55 | 22.65 | 3.68 |
| Cl | — | 24 | 0 | 0 | 43 | 0 | 0 | 79 | 0 |
| Cr | 25 | 6 | 0 | 18 | 0 | 0 | 39 | 5 | 0 |
| Ba | 0 | 13 | 5 | 17 | 7 | 5 | 24 | 11 | 9 |
| Sc | 4 | 8 | 3 | 6 | 3 | 5 | 8 | 6 | 2 |
| Ce | 0 | 2 | 0 | 0 | 0 | 1 | 2 | 0 | 0 |
| Nd | 0 | 4 | 0 | 1 | 1 | 0 | 5 | 6 | 0 |
| V | 59 | 0 | 0 | 41 | 0 | 0 | 69 | 2 | 0 |
| Co | 0 | 2 | 1 | 0 | 0 | 0 | 1 | 1 | 1 |
| Cu | 0 | 44 | 2 | 4 | 5 | 1 | 10 | 34 | 2 |
| Zn | 2 | 59 | 7 | 1 | 5 | 4 | 20 | 47 | 5 |
| Ni | 2 | 19 | 7 | 5 | 5 | 4 | 4 | 12 | 1 |
| Ga | 37 | 39 | 0 | 35 | 19 | 0 | 40 | 19 | 0 |
| Zr | 74 | 30 | 8 | 58 | 18 | 19 | 67 | 30 | 60 |
| Y | 5 | 5 | 0 | 6 | 3 | 0 | 7 | 0 | 0 |
| Sr | 1 | 22 | 0 | 2 | 7 | 0 | 10 | 15 | 0 |
| Rb | 13 | 42 | 5 | 18 | 13 | 4 | 10 | 53 | 3 |
| Nb | 32 | 12 | 5 | 29 | 2 | 5 | 16 | 20 | 4 |
| Pb | 22 | 37 | 26 | 27 | 30 | 13 | 1 | 129 | 10 |
| As | 4 | 1 | 4 | 9 | 3 | 0 | 3 | 23 | 9 |
| Mo | 0 | 0 | 0 | 0 | 0 | 0 | 2 | 0 | 0 |
| Loss | 14.88 | 5.97 | 2.58 | 15.29 | 5.19 | 2.64 | 2.69 | 4.91 | 2.72 |
| TOTAL | 99.78 | 93.78 | 100.26 | 99.63 | 100.82 | 100.14 | 99.40 | 96.49 | 99.83 |

The claims defining the invention are as follows:

1. A process for converting clay minerals of the kaolinite group to a substantially pure form of aluminum hydroxide and silica, respectively, comprising the steps of:
   (a) heating clay minerals of the kaolinite group to a temperature greater than 500° C. for causing a dehydroxylation of a crystallographic lattice and forming an intermediate meta-kaolin;
   (b) reacting the intermediate meta-kaolin with sulfuric acid thereby forming a mixture of meta-kaolin/sulfuric acid;
   (c) heating the mixture of meta-kaolin/sulfuric acid to form an aluminum salt solution and a residue of silica;
   (d) separating the residue of silica from the aluminum salt solution via filtration;
   (e) purifying the residue of silica obtained in said step (d) for obtaining a substantially pure form of fine particle silica;
   (f) adding ammonium sulfate to the aluminum salt solution remaining after said step (d) for forming an alum solution;
   (g) cooling the alum solution so that alum crystallizes therefrom;
   (h) separating alum that crystallized in said cooling step from the alum solution via filtration; and,
   (i) purifying the alum obtained in said step (h) for obtaining a substantially pure form of aluminum hydroxide.

2. The process for converting clay minerals of the kaolinite group to a substantially pure form of aluminum hydroxide and silica according to claim 1, wherein said step (i) comprises the steps of:

dissolving the alum in water to form an alum/water solution; and,
   adding ammonium hydroxide to the alum/water solution, thereby precipitating aluminum hydroxide from the alum/water solution.

3. The process for converting clay minerals of the kaolinite group to a substantially pure form of aluminum hydroxide and silica according to claim 2, further comprising the steps of:
   treating the aluminum hydroxide precipitated from the alum/water solution with neutral ammonium acetate solution for aiding in removing absorbed sulfate; and, washing the aluminum hydroxide with an alcohol for removing excess ammonium acetate therefrom.

4. The process for converting clay minerals of the kaolinite group to a substantially pure form of aluminum hydroxide and silica according to claim 2, further comprising the step of:
   treating the aluminum hydroxide precipitated from the alum/water solution via electrodialysis for aiding in removing absorbed sulfate.

5. The process for converting clay minerals of the kaolinite group to a substantially pure form of aluminum hydroxide and silica according to claim 1, wherein the clay minerals of the kaolinite group of said step (a) are a member selected from the group consisting of nacrite, dickite, kaolinite, and halloysite.

6. The process for converting clay minerals of the kaolinite group to a substantially pure form of aluminum hydroxide and silica according to claim 5, wherein the clay mineral are a crystallographic modification of kaolinite.

7. The process for converting clay minerals of the kaolinite group to a substantially pure form of aluminum hydroxide and silica according to claim 6, wherein the kaolinite crystallographically modified is kaolinite pM.

8. The process for converting clay minerals of the kaolinite group to a substantially pure form of aluminum hydroxide and silica according to claim 6, wherein the kaolinite crystallographically modified is kaolinite T.

9. The process for converting clay minerals of the kaolinite group to a substantially pure form of aluminum hydroxide and silica according to claim 1, wherein said step (b) occurs at ambient temperature.

10. The process for converting clay minerals of the kaolinite group to a substantially pure form of aluminum hydroxide and silica according to claim 1, wherein said step (b) further includes the mixture of meta-kaolin/sulfuric acid being heated and continuously stirred, thereby resulting in a rapid formation of aluminum salt.

11. The process for converting clay minerals of the kaolinite group to a substantially pure form of aluminum hydroxide and silica according to claim 10, wherein the clay mineral is meta-kaolinite and a resulting filtrate after said step (b) is mixed with additional meta-kaolin for removing an iron oxide contaminant and for reducing the acidity of the mixture of meta-kaolin/sulfuric acid.

12. The process for converting clay minerals of the kaolinite group to a substantially pure form of aluminum hydroxide and silica according to claim 11, further comprising the step of:

removing the iron oxide contaminant via solvent extraction.

13. The process for converting clay minerals of the kaolinite group to a substantially pure form of aluminum hydroxide and silica according to claim 1, further comprising the step of:

heating the aluminum hydroxide obtained in said step (i) to obtain aluminum oxide.

14. The process for converting clay minerals of the kaolinite group to a substantially pure form of aluminum hydroxide and silica according to claim 1, further comprising the step of:

mixing the residue of silica with sulfuric acid and ammonium sulfate, thereby producing a fine silica precipitate.

15. The process for converting clay minerals of the kaolinite group to a substantially pure form of aluminum hydroxide and silica according to claim 14, further comprising the steps of:

washing the fine silica precipitate with neutral ammonium acetate solution for aiding in the removal of absorbed iron oxides; and, washing the fine silica precipitate with an alcohol for removing excess ammonium acetate.

16. The process for converting clay minerals of the kaolinite group to a substantially pure form of aluminum hydroxide and silica according to claim 15, further comprising the step of:

purifying the fine silica precipitate via elutriation.

17. The process for converting clay minerals of the kaolinite group to a substantially pure form of aluminum hydroxide and silica according to claim 14, wherein the ratio of the concentration of sulfuric acid to the concentration of ammonium sulfate is 4:1.

18. The process for converting clay minerals of the kaolinite group to a substantially pure form of aluminum hydroxide and silica according to claim 17, further comprising the steps of:

washing the fine silica precipitate with neutral ammonium acetate solution for aiding in the removal of absorbed iron oxides; and, washing the fine silica precipitate with an alcohol for removing excess ammonium acetate.

19. The process for converting clay minerals of the kaolinite group to a substantially pure form of aluminum hydroxide and silica according to claim 18, further comprising the step of:

purifying the fine silica precipitate via elutriation.

\* \* \* \* \*